(12) United States Patent
Shimazaki

(10) Patent No.: US 9,471,265 B2
(45) Date of Patent: Oct. 18, 2016

(54) IMAGE PROCESSING SYSTEM, IMAGE PROCESSING METHOD, AND COMPUTER PROGRAM PRODUCT

(71) Applicant: Takeshi Shimazaki, Kanagawa (JP)

(72) Inventor: Takeshi Shimazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/524,107

(22) Filed: Oct. 27, 2014

(65) Prior Publication Data

US 2015/0131111 A1    May 14, 2015

(30) Foreign Application Priority Data

Nov. 8, 2013  (JP) .................................. 2013-232219
Jul. 18, 2014  (JP) .................................. 2014-148102

(51) Int. Cl.
| | | |
|---|---|---|
| *G06F 3/12* | (2006.01) | |
| *G06K 15/02* | (2006.01) | |
| *H04N 1/00* | (2006.01) | |
| *G06F 17/28* | (2006.01) | |

(52) U.S. Cl.
CPC .............. *G06F 3/1247* (2013.01); *G06F 3/125* (2013.01); *G06F 3/1208* (2013.01); *G06F 3/1288* (2013.01); *G06F 17/289* (2013.01); *H04N 1/00* (2013.01)

(58) Field of Classification Search
CPC .............. G06F 17/289; G06F 9/00442; G06F 9/00456; G06F 9/46; G06F 3/1208; G06F 3/125; G06F 3/1288; G06F 3/1247; H04N 1/00498; H04N 1/40062; H04N 1/00

USPC ........................................ 358/1.1, 1.15, 1.12
See application file for complete search history.

(56) References Cited

U.S. PATENT DOCUMENTS

| | | | | |
|---|---|---|---|---|
| 6,438,515 | B1 * | 8/2002 | Crawford ............... | G09B 19/06 434/157 |
| 2002/0064316 | A1 * | 5/2002 | Takaoka ................... | G06K 9/00 382/305 |
| 2010/0250233 | A1 * | 9/2010 | Tanaka .................. | G06F 3/1243 704/3 |
| 2011/0032562 | A1 * | 2/2011 | McCuen ............... | G06F 3/1205 358/1.15 |
| 2011/0320938 | A1 * | 12/2011 | Schorsch .................. | G06T 3/40 715/269 |

FOREIGN PATENT DOCUMENTS

| | | | | |
|---|---|---|---|---|
| JP | 2594415 | | 12/1996 | |
| JP | 2010128599 | * | 6/2010 | ............. G06F 17/28 |
| JP | 5126018 | | 11/2012 | |

OTHER PUBLICATIONS

English machine translation of JP2010128599, Oct. 6, 2010.*

* cited by examiner

*Primary Examiner* — Iriana Cruz
(74) *Attorney, Agent, or Firm* — Oblon, McClelland, Maier & Neustadt, L.L.P.

(57) ABSTRACT

An image processing system includes: a translating unit that translates text contained in translation target data to be subjected to translation processing and acquires translation data; and a generating unit that generates image data containing the translation target data and translation image data in which the text of the translation target data is replaced with the translation data.

17 Claims, 15 Drawing Sheets

IMAGE PROCESSING SYSTEM, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-232219 filed in Japan on Nov. 8, 2013 and Japanese Patent Application No. 2014-148102 filed in Japan on Jul. 18, 2014.

BACKGROUND OF THE INVENTION

1. Field of the Invention

The present invention relates to an image processing system, an image processing method, and a computer program product.

2. Description of the Related Art

A document is conventionally scanned using a reading apparatus to generate read image date of the documents. When a document is desired to be stored as text data, the optical character recognition (OCR) function is used. Specifically, read image data of a document scanned by a reading apparatus of an image processing apparatus is recognized by performing the OCR function, thereby acquiring text data from the read image data.

Translation function is known that translates electronic files or text data obtained by performing the OCR function. Japanese Patent No. 2594415, for example, is an invention of an image forming apparatus that subjects read text information to translation processing and puts a translation result into a text area, which can ensure an area required to form an image of text information by reducing picture information to form the reduced picture information. Japanese Patent No. 5126018 is an invention of a document image processing apparatus that can, when a translation result is output, insert the translation result into between the lines of the original text.

However, the conventional methods of image processing cannot achieve both associating a translation result with translation target data before translation and displaying the translation result with the layout of the translation target data maintained.

In view of the above, there is a need to provide an image processing system, an image processing method, and a computer program product that can obtain a translation result that makes it easy to associate the translation result with translation target data and is easy-to-see without spoiling the layout of the translation target data.

SUMMARY OF THE INVENTION

It is an object of the present invention to at least partially solve the problems in the conventional technology.

An image processing system includes: a translating unit that translates text contained in translation target data to be subjected to translation processing and acquires translation data; and a generating unit that generates image data containing the translation target data and translation image data in which the text of the translation target data is replaced with the translation data.

An image processing method includes: by a translating unit, translating text contained in translation target data to be subjected to translation processing and acquiring translation data; and, by a generating unit, generating image data containing the translation target data and translation image data in which the text of the translation target data is replaced with the translation data.

A computer program product includes a non-transitory computer-readable medium containing an information processing program. The program causes a computer to function as: a translating unit that translates text contained in translation target data to be subjected to translation processing and acquires translation data; and a generating unit that generates image data containing the translation target data and translation image data in which the text of the translation target data is replaced with the translation data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of an image processing system, an image processing method, and a computer program product in detail with reference to the attached drawings.

First Embodiment

Figure 1:
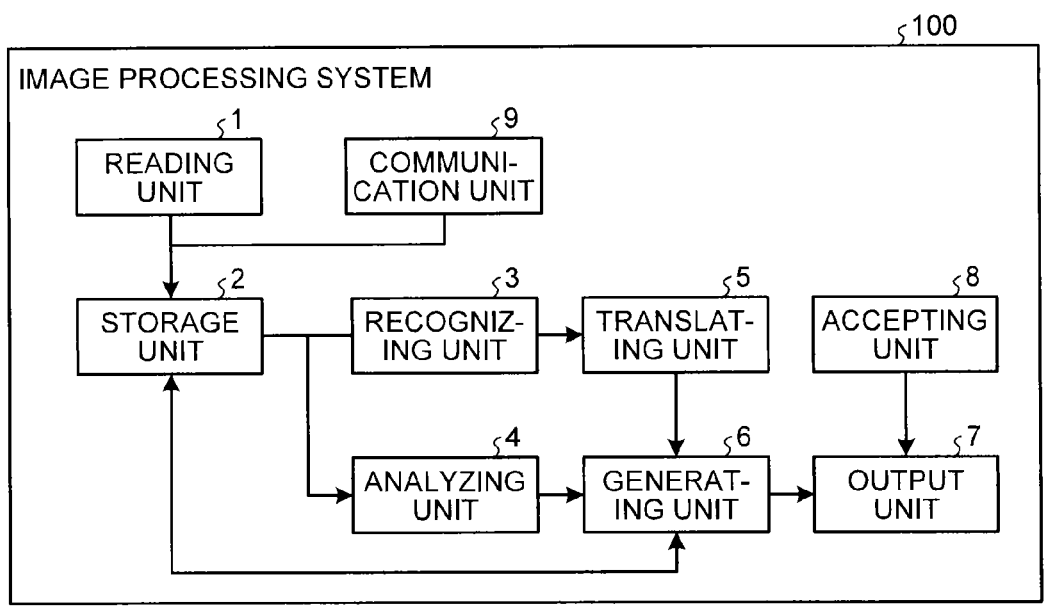
FIG. 1 is a diagram illustrating an example of the configuration of an image processing system according to a first embodiment.

FIG. 1 is a diagram illustrating an example of the configuration of an image processing system 100 according to a first embodiment. The image processing system 100 according to the present embodiment includes a reading unit 1, a storage unit 2, a recognizing unit 3, an analyzing unit 4, a translating unit 5, a generating unit 6, an output unit 7, an accepting unit 8, and a communication unit 9.

The reading unit 1 acquires read image data containing a read image (a document image) read from a document. The reading unit 1 stores the read image data in the storage unit 2. An example of the read image data will be described below with reference to FIG. 2.

The image processing system 100 receives electronic data transmitted from a PC or the like by the communication unit 9. The electronic data may have any format. The electronic data is, for example, data prepared by document preparation software, presentation software, spreadsheet software, or the like, PDF (registered trademark) data, or CAD data. The communication unit 9 stores the received electronic data in the storage unit 2. Any data to be subjected to translation processing including read image data and other electronic data are referred to as translation target data.

The recognizing unit 3 acquires the translation target data from the storage unit 2 and recognizes text contained in the translation target data. The recognizing unit 3 transmits text data indicating the recognized text to the translating unit 5.

The analyzing unit 4 acquires the translation target data from the storage unit 2, analyzes the layout of images of the translation target data, and discriminates between a text area containing text and a non-text area containing no text. The analyzing unit 4 transmits layout data in which an image area is discriminated between the text area and the non-text area to the generating unit 6. An example of a method for discriminating the text area will be described below with reference to FIG. 3. Any data prepared by document preparation software, presentation software, or spreadsheet software, for example, among the pieces of electronic data may be subjected to only translation processing on the text data (that performs processing to replace the original text with a translation by the generating unit 6 described below) without analyzing the layout by the analyzing unit 4.

The translating unit 5 receives the text data from the recognizing unit 3 and translates the text contained in the text data and acquires translation data. The translating unit 5 transmits the translation data to the generating unit 6.

The generating unit 6 acquires the translation target data from the storage unit 2, receives the layout data from the analyzing unit 4, and receives the translation data from the translating unit 5. The generating unit 6 generates translation image data in which the text (the text data) in the text area of the translation target data is replaced with the text (the translation data) translated by the translating unit 5. The generating unit 6 generates image data for output containing the translation target data and the translation image data. The generating unit 6 stores therein the translation image data and the image data for output in association with the translation target data in the storage unit 2. An example of the translation image data will be described below with reference to FIG. 4. Examples of the image data for output will be described below with reference to FIGS. 5 to 7.

The output unit 7 outputs the image data for output, the translation image data, or the translation target data as printout or electronic data. The output unit 7 has a function of a general image processing apparatus. Specifically, the output unit 7 includes an image forming engine unit (a developing unit, a transfer unit, a fixing unit, and the like), a double-sided printing unit that performs double-sided printing, and a finisher (a stapler or the like), which are not illustrated in FIG. 1. When an output image is set to be an electronic file, the output unit 7 transmits the electronic file or a link indicating the storage place of the electronic file to a user terminal.

The accepting unit 8 accepts operation input from the user. The accepting unit 8 is a liquid crystal touch panel, for example. The operation input means, for example, the selection of output data (the translation target data, the translation image data, or the image data for output), the selection of an output format (printout or electronic data), the selection of the layout of the image data for output, or the like. Examples of the layout of the image data for output will be described below with reference to FIGS. 5 to 7.

Figure 2:
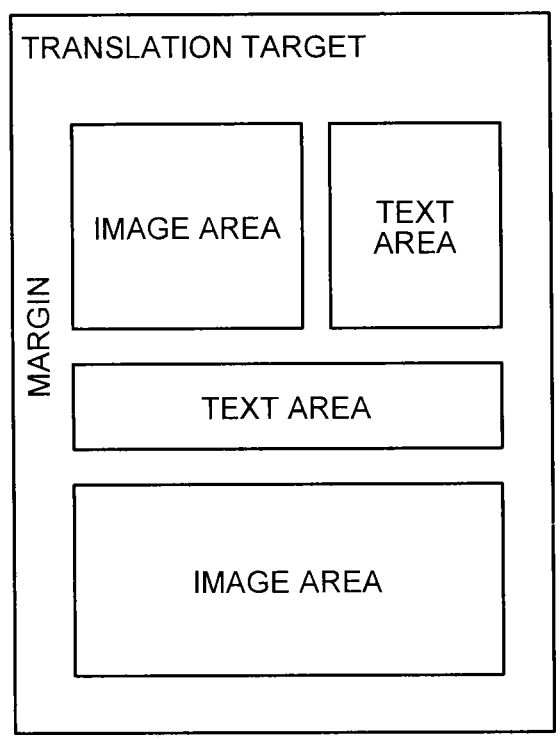
FIG. 2 is a diagram illustrating an example of translation target data according to the first embodiment.

FIG. 2 is a diagram illustrating an example of the translation target data according to the first embodiment. The example in FIG. 2 is a case when a translation target image of the translation target is contained within one page. The translation target image contains text areas, a margin (a non-text area), and image areas (non-text areas). The image area is a picture or a photograph, for example.

Figure 3:
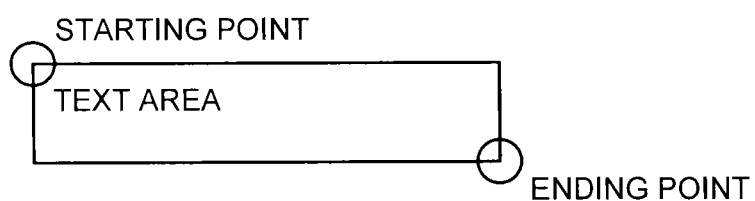
FIG. 3 is a diagram illustrating an example of a method for discriminating a text area by an analyzing unit according to the first embodiment.

FIG. 3 is a diagram illustrating an example of a method for discriminating a text area by the analyzing unit 4 according to the first embodiment. The analyzing unit 4 recognizes text areas in units of a paragraph of sentences, a cell of a table, or the like. The analyzing unit 4 specifies, for example, a rectangular text area with text coordinates that specify with the coordinates of the upper left vertex (a starting point) of the text area and the coordinates of the lower right vertex (an ending point) thereof. In other words, the analyzing unit 4 represents the text area of the above layout data with the text coordinates.

Figure 4:
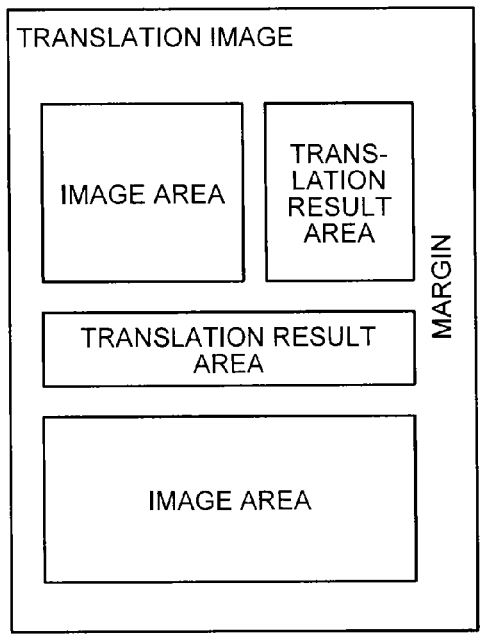
FIG. 4 is a diagram illustrating an example of translation image data according to the first embodiment.

FIG. 4 is a diagram illustrating an example of the translation image data according to the first embodiment. The example in FIG. 4 is a case of translation image data corresponding to the translation target data in FIG. 2. The translation image data indicates a translation image. The translation image contains translation result areas, a margin (a non-text area), and image areas (non-text areas). The translation result area corresponds to the text area of the read image data. In other words, the translation result area is an area in which the text (text data) of the text area of the read image is replaced with the text (translation data) translated by the translating unit 5. In this case, when the translated text is longer than the text of the text area (when the data amount (text length or byte count) of the translation data is larger than the data amount of the text data), the size of the text may be reduced so that the entire translation result can be contained within the translation result area. Without inserting all the text translated by the translating unit 5 into the translation result area, only the text of the same data amount as the text of the text area may be inserted into the translation result area. In this case, a translation result obtained by translating only the summary of text before translation, for example, is inserted into the translation result area. A technique to extract part of the text showing the summary (abstract) or the like of the text from the text is already known, and the detailed description thereof is omitted. When a translation cannot be contained within the text area, the rest of the translation may be formed on the non-text area immediately below or around the text area. The areas (image areas, tables, margins) other than the text can be viewed and checked on the adjacently arranged translation target, which facilitates comparison without changing the position relation of the entire layout.

Figure 5:
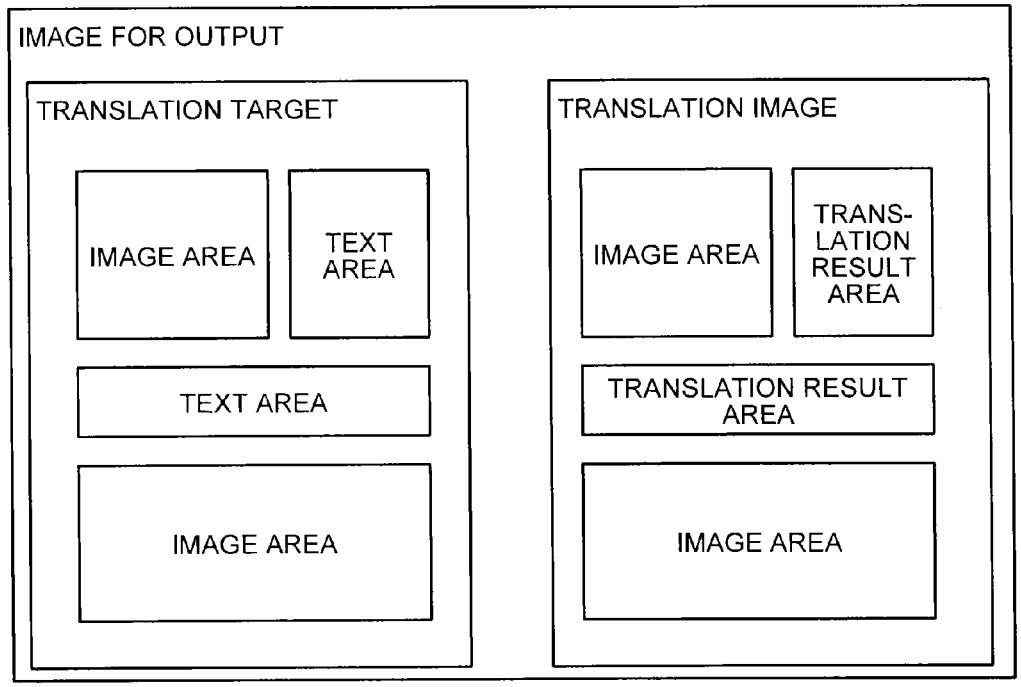
FIG. 5 is a diagram illustrating Example 1 of image data for output according to the first embodiment.

FIG. 5 is a diagram illustrating Example 1 of the image data for output according to the first embodiment. The example of the image data for output in FIG. 5 contains a page of the translation target data and a page of the translation image data generated from the page of the translation target data on the same page. This configuration enables both the translation target data and the translation image data to be viewed at the same time. The generating unit 6, for example, integrates the translation target data and the translation image corresponding to the relevant read image side by side and generates the image data for output as one image. This configuration causes both the translation target data and the translation image to be viewed at the same time. In particular, the translation target and the translation image of the same area or the same page are generated and output so as to be viewable in a state in which they are arranged in portrait or landscape orientation, thereby enabling the corresponding areas to be viewed at a glance in a state in which they are adjacently arranged and making it easy for the user to grasp the correspondence relation between before and after translation even when, for example, a large volume of documents are printed. When the translation target and the translation image of the same page are arranged in portrait or landscape orientation, the effect that the layout relation can be maintained and grasp of the correspondence relation is facilitated can be obtained.

The image data for output may have any size. When the translation target and the translation image have A4 size, for example, the generating unit 6 first reduces both to A5 size. Using the A5 size translation target and the A5 size translation image, the generating unit 6 integrates the translation target and the translation image into A4 size in side by side manner and generates the image data for output as one A4 size image. The generating unit 6 may generate the image data for output by integrating the translation target and the translation image, while maintaining them at A4 size, into one A3 size sheet in side by side manner. The generating unit 6 may integrate the translation target and the translation image into one sheet using the integral printing function of the output unit 7.

Figure 6:
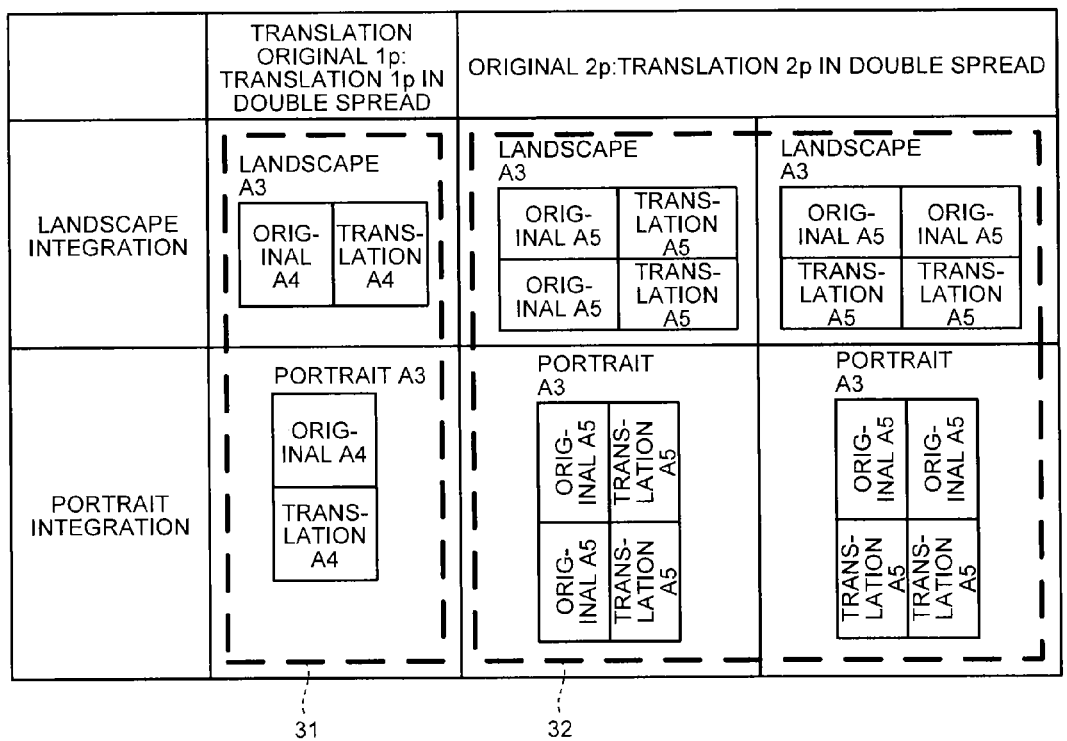
FIG. 6 is a diagram illustrating examples of the pattern of integration of the image data for output according to the first embodiment.

FIG. 6 is a diagram illustrating examples of the pattern of integration of the image data for output according to the first embodiment. Pattern 31 illustrates examples of integration in which a sheet is divided into two parts. The examples of Pattern 31 illustrate cases of arranging an A4 size translation target (translation original) and an A4 size translation image (translation) in an A3 sheet in landscape or portrait orientation. The sheet may have any size. Pattern 31, for example, may arrange an A5 size translation target (translation original) and an A5 size translation image (translation) in an A4 sheet in landscape or portrait orientation.

Pattern 32 illustrates examples of integration in which a sheet is divided into four parts. The examples of Pattern 32 illustrate cases of arranging two pages of A5 size translation target (translation original) and two pages of A5 size translation image (translation) in an A3 sheet in landscape or portrait orientation.

Figure 7:
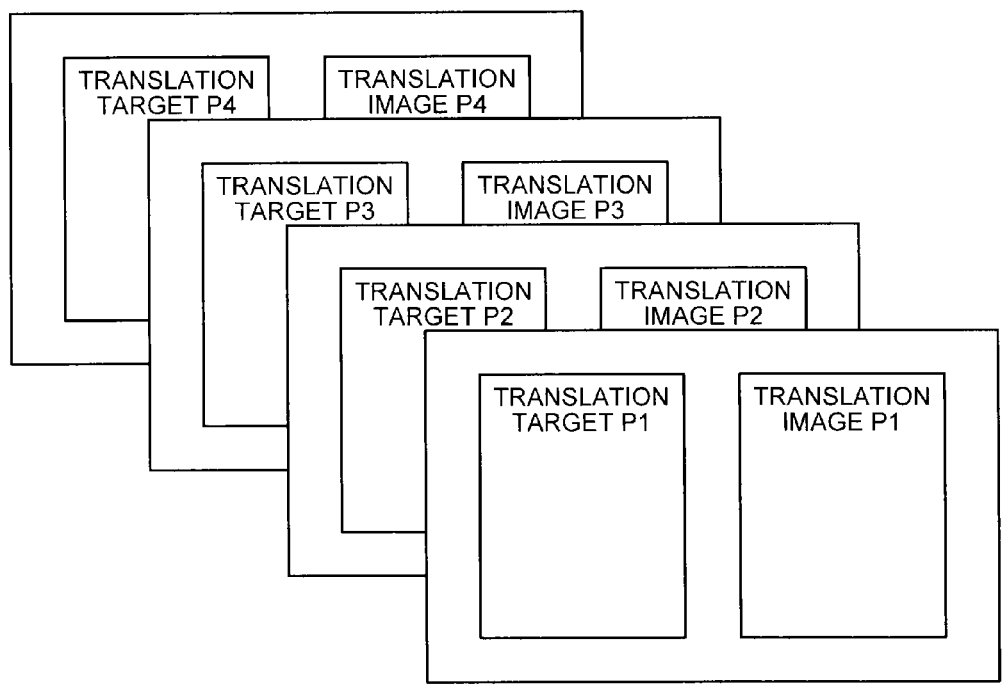
FIG. 7 is a diagram illustrating Example 2 of the image data for output according to the first embodiment.

FIG. 7 is a diagram illustrating Example 2 of the image data for output according to the first embodiment. The example of the image data for output in FIG. 7 is an example of the image data for output when each of the translation target data and the translation image data corresponding to the translation target data contains a plurality of pages (four pages in FIG. 7). When each of the translation target data and the translation image data contains N pages, the generating unit 6 causes the image data for output to contain N pages accordingly.

Figure 8:
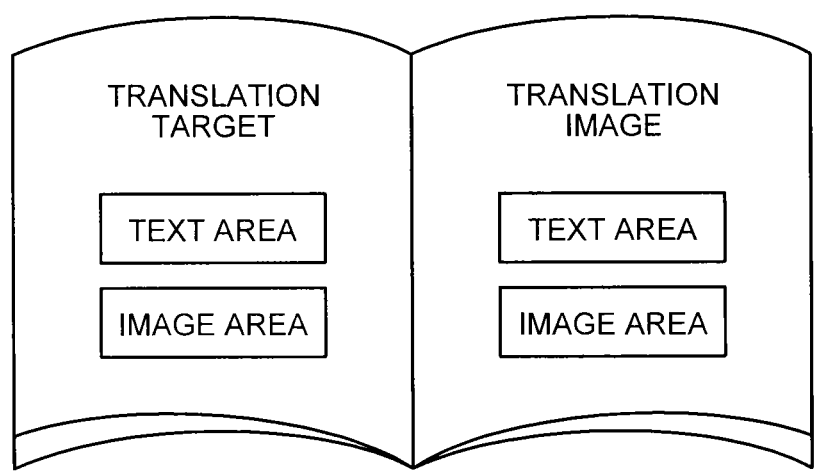
FIG. 8 is a diagram illustrating Example 3 of the image data for output according to the first embodiment.

FIG. 8 is a diagram illustrating Example 3 of the image data for output according to the first embodiment. The example in FIG. 8 is an example of a case in which the generating unit 6 uses the double-sided printing function of the output unit 7 and the finisher (the stapler or the like) of the output unit 7 (the example in FIG. 8 illustrates a state in which the output unit 7 outputs the image data for output as a booklet). Specifically, FIG. 8 is an example in which the image data for output contains pages of the translation target data and pages of the translation image data generated from the pages of the translation objet data alternately (a translation target P1, a translation image P1, a translation target P2, a translation image P2, . . . ). This configuration enables both the translation target and the translation image to be viewed at the same time.

When the booklet is formed using the finisher, performing printing starting from the second page of the booklet can cause the translation target and the translation image of the same page to be viewable when the booklet is laid open. The translation target and the translation image of the image data for output are output so as to be capable of being alternately viewed from the left of the double spread of the booklet in such a manner that the first page of the image data for output is output on the back side of the first sheet of the booklet, the second page of the image data for output is output on the front side of the second sheet of the booklet, the third page of the image data for output is output on the back side of the second sheet of the booklet, and the fourth page of the image data for output is output on the front side of the third sheet of the booklet. The translation target and the translation image of the same area or the same page are generated and output so as to be capable of being viewed such that they are arranged in landscape or portrait orientation in the double spread of the booklet, thereby making it easy for the user to grasp the correspondence relation between before and after translation.

Figure 9:
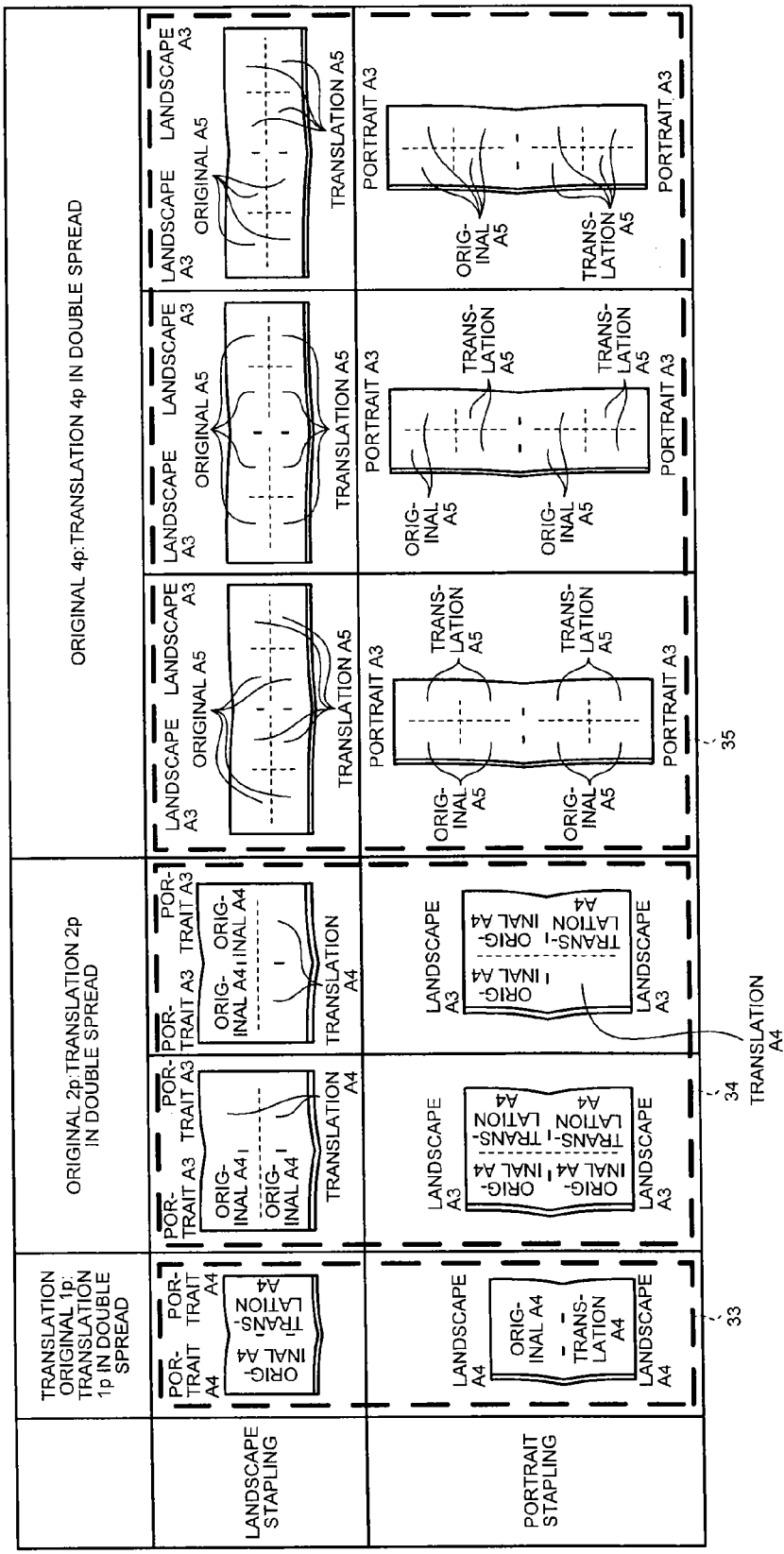
FIG. 9 is a diagram illustrating examples of the pattern of stapling of the image data for output according to the first embodiment.

FIG. 9 is a diagram illustrating examples of the pattern of stapling of the image data for output according to the first embodiment. Pattern 33 illustrates cases in which one page of an A4 size translation target and one page of an A4 size translation image are arranged in landscape or portrait orientation in the double spread, and a position between the translation target and the translation image is stapled (the stapling of A4 sheets). The sheet may have any size. Pattern 33 may arrange, for example, one page of an A3 size translation target and one page of A3 size translation image in landscape or portrait orientation in the double spread and staple a position between the translation target and the translation image (the stapling of A3 sheets).

Pattern 34 illustrates cases in which two pages of A4 size translation targets and two pages of A4 size translation images are arranged in landscape or portrait orientation in the double spread, and a position between the translation target and the translation image is stapled (the stapling of A3 sheets). The sheet may have any size. Pattern 34 may arrange, for example, two pages of A5 size translation targets and two pages of A5 size translation images in landscape or portrait orientation in the double spread and staple a position between the translation target and the translation image (the stapling of A4 sheets).

Pattern 35 illustrates cases in which four pages of A5 size translation targets and four pages of A5 size translation images are arranged in landscape or portrait orientation in the double spread, and a position between the translation target and the translation image is stapled (the stapling of A3 sheets).

The accepting unit 8 presents the integration forms of Pattern 31 and Pattern 32 and the stapling forms of Patterns 33 to 35 and accepts selection from the user. Choices of Patterns 31 to 35 may be automatically displayed depending on cases such as the number of pages of the translation target data. When the translation target data contains only one page (one sheet), for example, the image data for output contains two pages, and choices of the integration form of Pattern 31 and the stapling form of Pattern 33 are displayed. When the translation target data contains two pages, the image data for output contains four pages, and choices of the integration forms of Pattern 31 and Pattern 32 and the stapling forms of Pattern 33 and Pattern 34 are displayed. When the translation target data contains three or more pages, choices of the integration forms of Pattern 31 and Pattern 32 and the stapling forms of Patterns 33 to 35 are displayed. Changing the choices of an output method automatically on the operation screen of the accepting unit 8 in accordance with the number of pages of the translation target can make it easy for the user to select.

Figure 10:
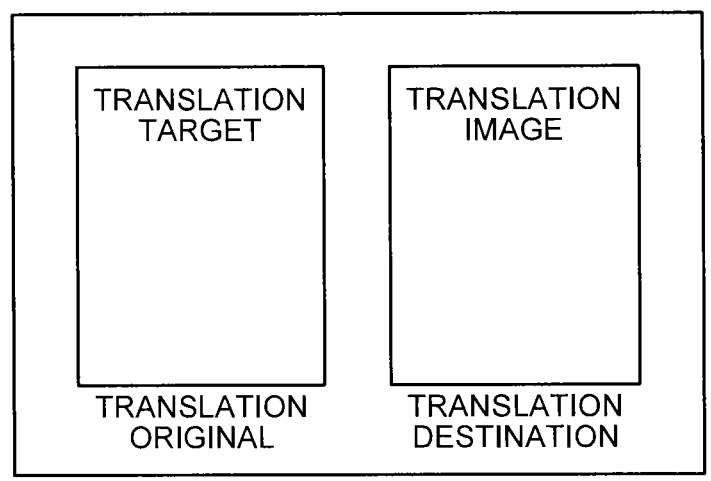
FIG. 10 is a diagram illustrating an example of text strings added near images contained in the image data for output according to the first embodiment.

When being output to one sheet by integral printing or being output in the form of booklet using the finisher (the stapler or the like) in order to enable the translation target and the translation image to be viewed at the same time, display may be performed so that it is understandable which one is the translation target image (translation target) and which one is the translation image. FIG. 10 is a diagram illustrating examples of text strings added near images contained in the image data for output according to the first embodiment. As in FIG. 10, the generating unit 6 may add the text strings of "translation original" and "translation destination" near the respective images. The generating unit 6 can form the text strings of "translation original" and "translation destination" at any position that is likely to be a margin and easy to be viewed such as the upper part, end part, and lower part. When there is no margin on the translation target image, the generating unit 6 can achieve easy-to-view indications by forming the image so as to make the image pale at the indications or by making the indications by white space on the colored background. When a translation result using the stapler is output, the images of the indications may be formed at an end of a sheet other than an end to be stapled, because the end of the sheet to be stapled forms a depression when the booklet is formed, which makes the indications difficult to be viewed. The text string as an indication indicating the translation target image may be "translation original," "before translation," "translation target," "original," "translation target image," or the like. As an indication indicating the translation, it may be "translation destination," "after translation," "translation result," "translation," "translated text," "translation image," or the like. Because a document may have a large number of pages or no page number may be contained in a document, a page number indicating the number of page of the document may be further provided in the generating unit 6. The configuration in which the user can select using the accepting unit 8 whether the text string and page number are to be displayed may be employed. Because a person who has not seen the translation target or a person who receives a printed matter of the image data for output might not be able to understand at a glance which image is one before translation or after translation, providing the above indications makes it possible to grasp the correspondence relation of the contents of materials at a glance and can make it easy for the user to grasp the contents of materials.

Figure 11:
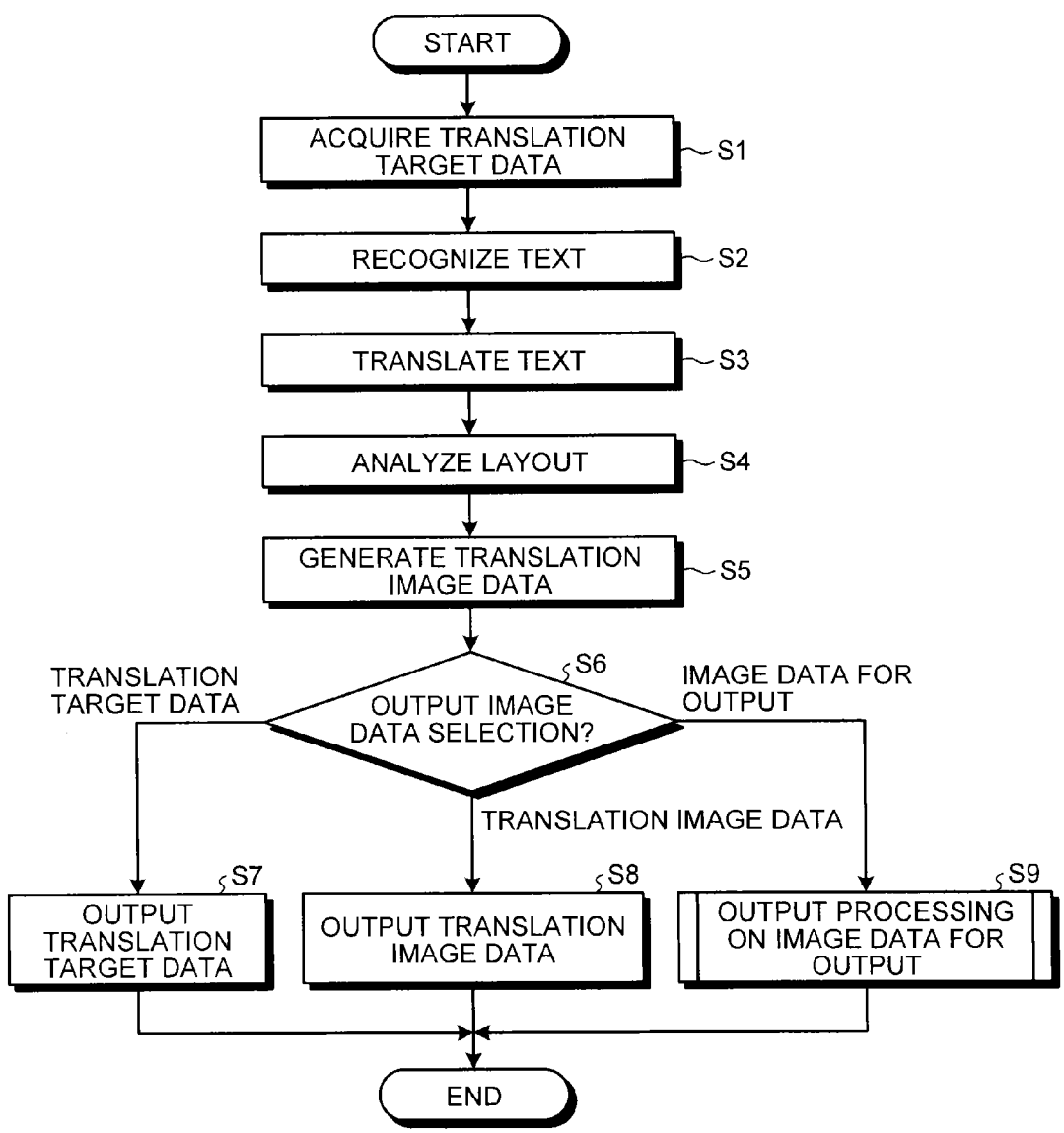
FIG. 11 is a flowchart illustrating an example of an image processing method according to the first embodiment.

Next, an image processing method according to the present embodiment will be described with reference to a flowchart. FIG. 11 is a flowchart illustrating an example of the image processing method according to the first embodiment.

The image processing system 100 acquires translation target data (read image data or electronic data) by the reading unit 1 or the communication unit 9 (Step S1). The reading unit 1 stores the translation target data in the storage unit 2. The recognizing unit 3 then acquires the translation target data from the storage unit 2 and recognizes text contained in the translation target data (Step S2). The recognizing unit 3 transmits text data indicating the recognized text to the translating unit 5. Next, the translating unit 5 receives the text data from the recognizing unit 3, translates the text contained in the text data, and acquires translation data (Step S3). The translating unit 5 transmits the translation data to the generating unit 6.

The analyzing unit 4 acquires the translation target data from the storage unit 2, analyzes the layout of images of the translation target data, discriminates between a text area containing text and a non-text area containing no text (Step S4). The analyzing unit 4 transmits layout data in which the text area is discriminated from the non-text area in an image area, to the generating unit 6.

The generating unit 6 acquires the translation target data from the storage unit 2, receives the layout data from the analyzing unit 4, and receives the translation data from the translating unit 5. The generating unit 6 then generates translation image data in which the text (the text data) in the text area of the translation target data is replaced with the text (the translation data) translated by the translating unit 5 (Step S5).

For any data (data having obvious layout) prepared by document preparation software, presentation software, or spreadsheet software, for example, among the pieces of electronic data, there is no need to analyze the layout by the analyzing unit 4 and to acquire the layout data. In other words, the generating unit 6 does not need to perform processing based on the layout data.

Next, the accepting unit 8 accepts operation input indicating the selection of output data (the translation target data, the translation image data, or the image data for output) from the user (Step S6). If the output data is the translation target data (translation target data at Step S6), the output unit 7 outputs the translation target data through printing or electronic data (Step S7). If the output data is the translation image data (translation image data at Step S6), the output unit 7 outputs the translation image data through printing or electronic data (Step S8). If the output data is the image data for output (image data for output at Step S6), output processing on the image data for output is performed (Step S9).

Figure 12:
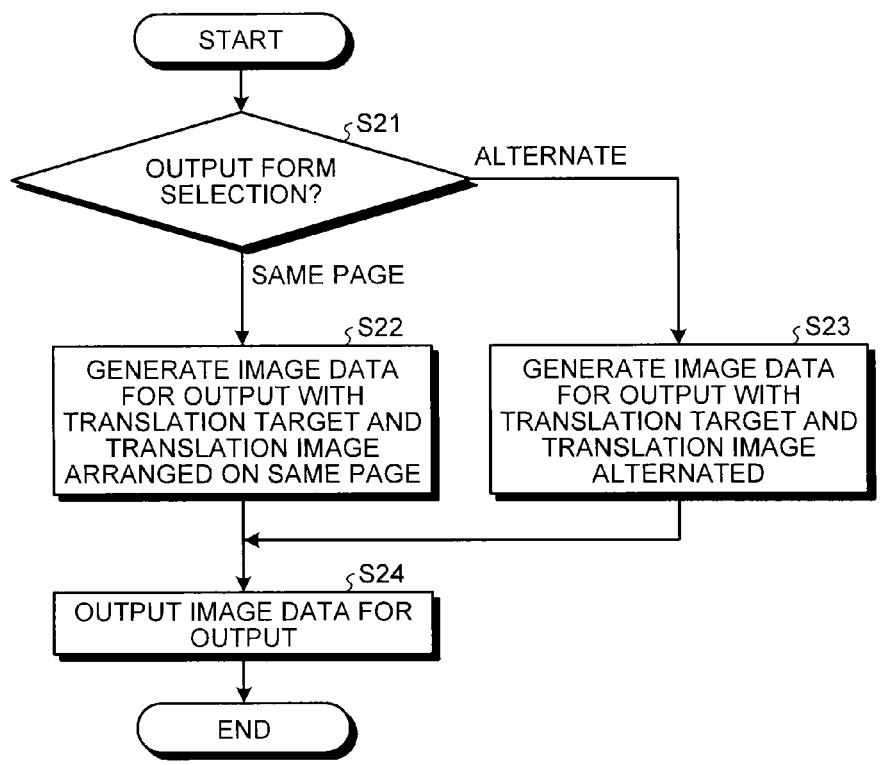
FIG. 12 is a flowchart illustrating an example of processing to output the image data for output according to the first embodiment.

FIG. 12 is a flowchart illustrating an example of processing to output the image data for output according to the first embodiment. The accepting unit 8 accepts operation input indicating the selection of the layout (the same page (refer to FIG. 5) or alternately (refer to FIG. 8)) of the image data for output from the user (Step S21). The accepting unit 8 presents the above Pattern 31 and Pattern 32 on integration and Patterns 33 to 35 on stapling in accordance with the number of pages of the translation target and also accepts input indicating the presence or absence of the setting of integration or stapling from the user at the same time.

If the layout of the image data for output is the same page (same page at Step S21), the generating unit 6 generates the image data for output with the translation target data image and the translation image arranged on the same page (Step S22). If the layout of the image data for output is alternate (alternate at Step S21), the generating unit 6 generates the image data for output with the translation target data image and the translation image alternated (Step S23).

The output unit 7 then outputs the image data for output through printing or electronic data (Step S24).

Figure 13:
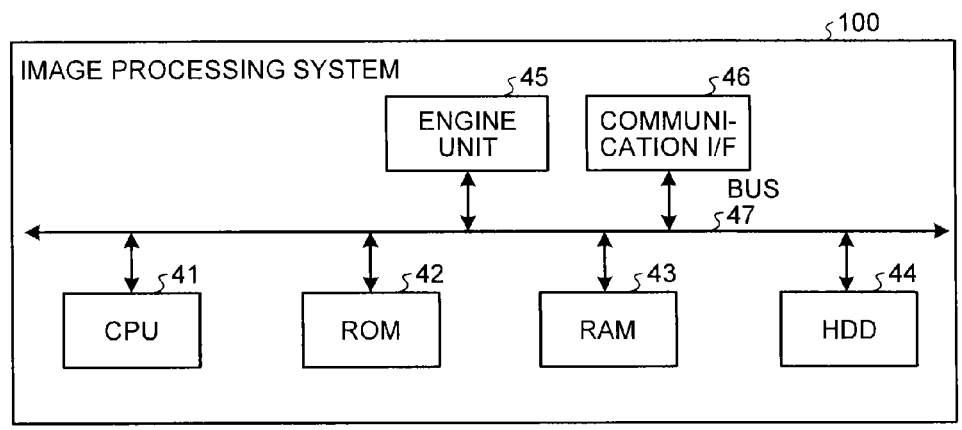
FIG. 13 is a diagram illustrating an example of the hardware configuration of the image processing system according to the first embodiment.

Next, an example of the hardware configuration of the image processing system 100 according to the present embodiment will be described. FIG. 13 is a diagram illustrating an example of the hardware configuration of the image processing system 100 according to the first embodiment. The hardware of the image processing system 100 according to the present embodiment includes a CPU 41, a ROM 42, a RAM 43, an HDD 44, an engine unit 45, and a communication I/F 46. The CPU 41, the ROM 42, the RAM 43, the HDD 44, the engine unit 45, and the communication I/F 46 are connected with each other via a bus 47.

The CPU 41 comprehensively controls the operation of the image processing system 100. The CPU 41 executes a program stored in the ROM 42, the HDD 44, or the like with the RAM 43 as a work area, thereby controlling the operation of the image processing system 100. The CPU 41 controls the operation of various functions such as the printer function, the copy function, the scanner function, and the facsimile function. The engine unit 45 is hardware implementing the printer function, the copy function, the scanner function, the facsimile function, and/or the like. The engine unit 45 includes, for example, a plotter that performs printing on sheet materials such as a sheet, a scanner that scans and reads documents, and a fax that performs fax communication. The engine unit 45 further includes a finisher that performs postprocessing (stapling, punching, and bending) on printed sheet materials, a double-sided conveying unit for performing double-sided printing, and an automatic document feeder (ADF) that automatically feeds documents. The communication I/F 46 is an interface that causes the image processing system 100 to communicate with other devices.

The program executed by the image processing system 100 according to the present embodiment may be stored in a computer-readable recording medium such as a CD-ROM, a memory card, a CD-R, and a DVD as an installable or executable file and may be provided as a computer program product. The program executed by the image processing system 100 according to the present embodiment may be stored in a computer connected to a network such as the Internet and provided by being downloaded via the network. The program executed by the image processing system 100 according to the present embodiment may be provided or distributed via the network such as the Internet without being downloaded. The program of the image processing system 100 according to the present embodiment may be stored in advance in the ROM 42, the HDD 44, or the like and provided.

The program executed by the image processing system 100 according to the present embodiment has a module structure including functional blocks (the recognizing unit 3, the analyzing unit 4, the translating unit 5, and the generating unit 6) that can also be implemented as a program among the above functional blocks of the image processing system 100.

As for the modules, as actual hardware, the CPU 41 executes the program, thereby loading the respective modules onto the RAM 43. In other words, the respective modules are generated on the RAM 43. Part of or the entire functional blocks of the image processing system 100 may be not implemented by the program but implemented by hardware such as an integrated circuit (IC).

As described above, the image processing system 100 according to the present embodiment causes the generating unit 6 to generate the image data for output containing the translation target data and the translation image data in which the text data in the text area of the translation target data is replaced with the translation data. This configuration makes it possible to obtain a translation result that makes it easy to associate the translation result (the translation image data) with the translation target data (the read image data or the electronic data) and is easy-to-see with the layout of the translation target data maintained.

Second Embodiment

Figure 14:
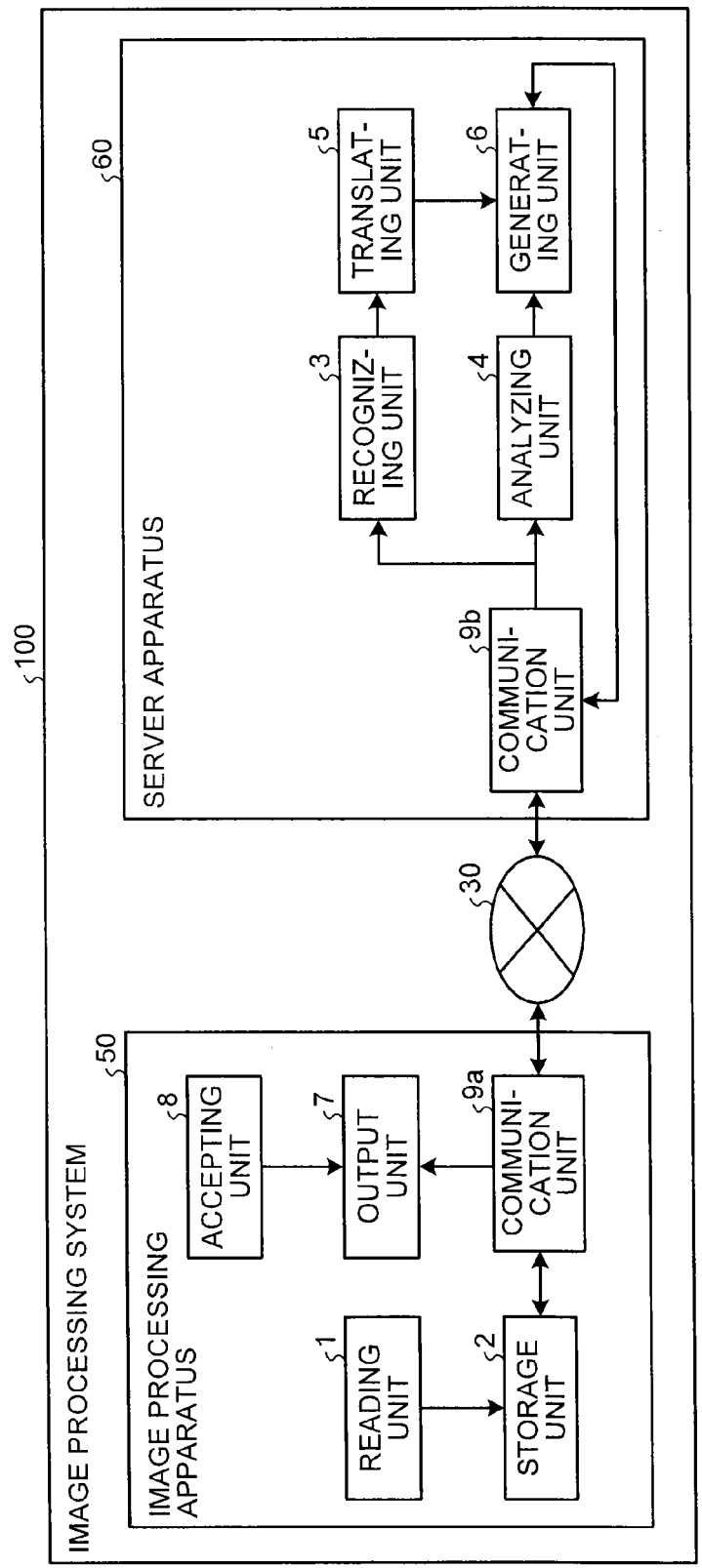
FIG. 14 is a diagram illustrating an example of the configuration of an image processing system according to a second embodiment.

Next, the image processing system 100 according to a second embodiment will be described. FIG. 14 is a diagram illustrating an example of the configuration of the image processing system 100 according to the second embodiment. The present embodiment describes a case of implementing the image processing system 100 according to the first embodiment by an image processing apparatus 50 and a server apparatus 60. The image processing apparatus 50 and the server apparatus 60 are connected via a network 30. The network 30 may be a wired system or a wireless system or may be a combination of both systems.

The image processing apparatus 50 includes the reading unit 1, the storage unit 2, the output unit 7, the accepting unit 8, and a communication unit 9a. The server apparatus 60 includes the recognizing unit 3, the analyzing unit 4, the translating unit 5, the generating unit 6, and a communication unit 9b. The reading unit 1, the storage unit 2, the recognizing unit 3, the analyzing unit 4, the translating unit 5, the generating unit 6, the output unit 7, and the accepting unit 8 are similar to those of the first embodiment, and the description thereof is omitted. The communication unit 9a and the communication unit 9b transmit and receive data (translation target data including read image data and electronic data, translation image data, image data for output, or the like) between the image processing apparatus 50 or a PC and the server apparatus 60. Specifically, the image processing apparatus 50 or the PC transmits the translation target data to the server apparatus 60 via the communication unit 9a. The server apparatus 60, upon reception of the translation target data via the communication unit 9b, generates the translation image data and the image data for output from the translation target data. The server apparatus 60 then transmits the translation image data and the image data for output to the image processing apparatus 50 via the communication unit 9b.

Figure 15:
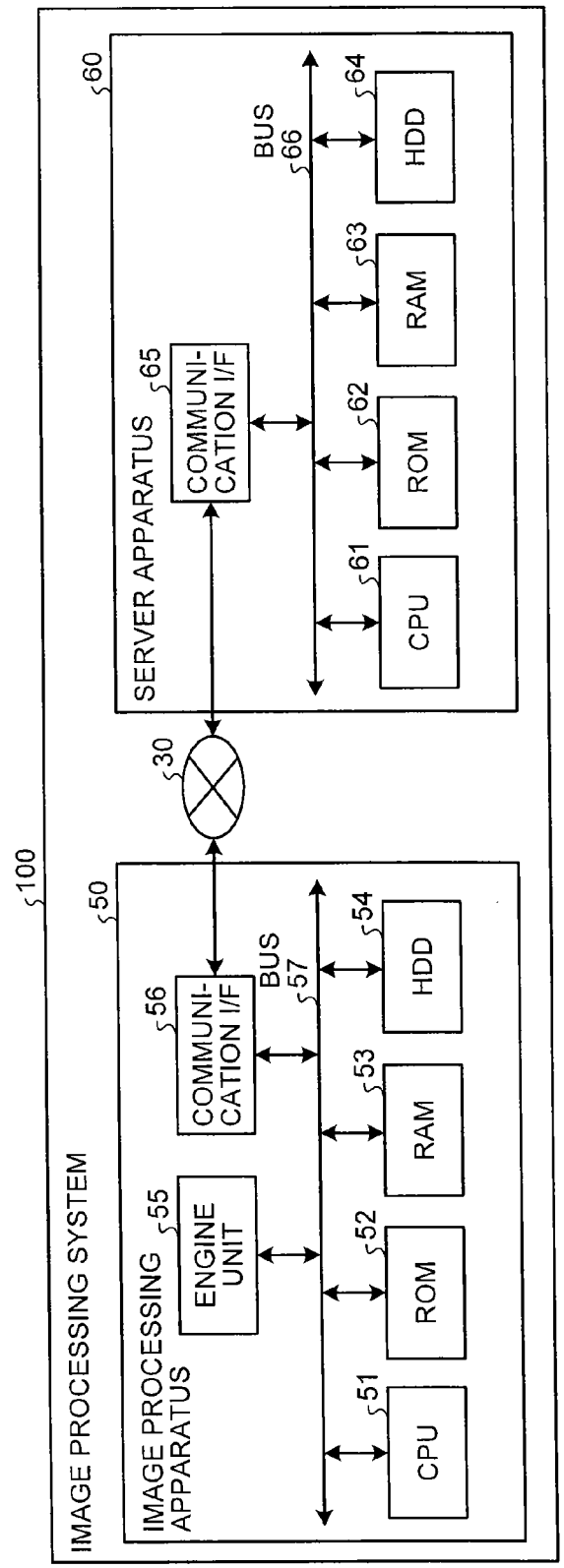
FIG. 15 is a diagram illustrating an example of the hardware configuration of the image processing system according to the second embodiment.

FIG. 15 is a diagram illustrating an example of the hardware configuration of the image processing system 100 according to the second embodiment. The hardware of the image processing system 100 according to the present embodiment includes the image processing apparatus 50 and the server apparatus 60. The hardware of the image processing apparatus 50 includes a CPU 51, a ROM 52, a RAM 53, an HDD 54, an engine unit 55, and a communication I/F 56. The CPU 51, the ROM 52, the RAM 53, the HDD 54, the engine unit 55, and the communication I/F 56 are connected with each other via a bus 57. The hardware of the server apparatus 60 includes a CPU 61, a ROM 62, a RAM 63, an HDD 64, and a communication I/F 65. The CPU 61, the ROM 62, the RAM 63, the HDD 64, and the communication I/F 65 are connected with each other via a bus 66. The configurations of the respective pieces of hardware are similar to those of the first embodiment, and the description thereof is omitted.

The image processing system 100 according to the present embodiment performs the processing to generate the translation image data and the image data for output by the server apparatus 60, and a plurality of image processing apparatuses 50 can share the server apparatus 60, for example. In other words, the image processing system 100 according to the present embodiment has advantages in terms of costs and management such as setting data related to image processing and program updating.

Third Embodiment

Figure 16:
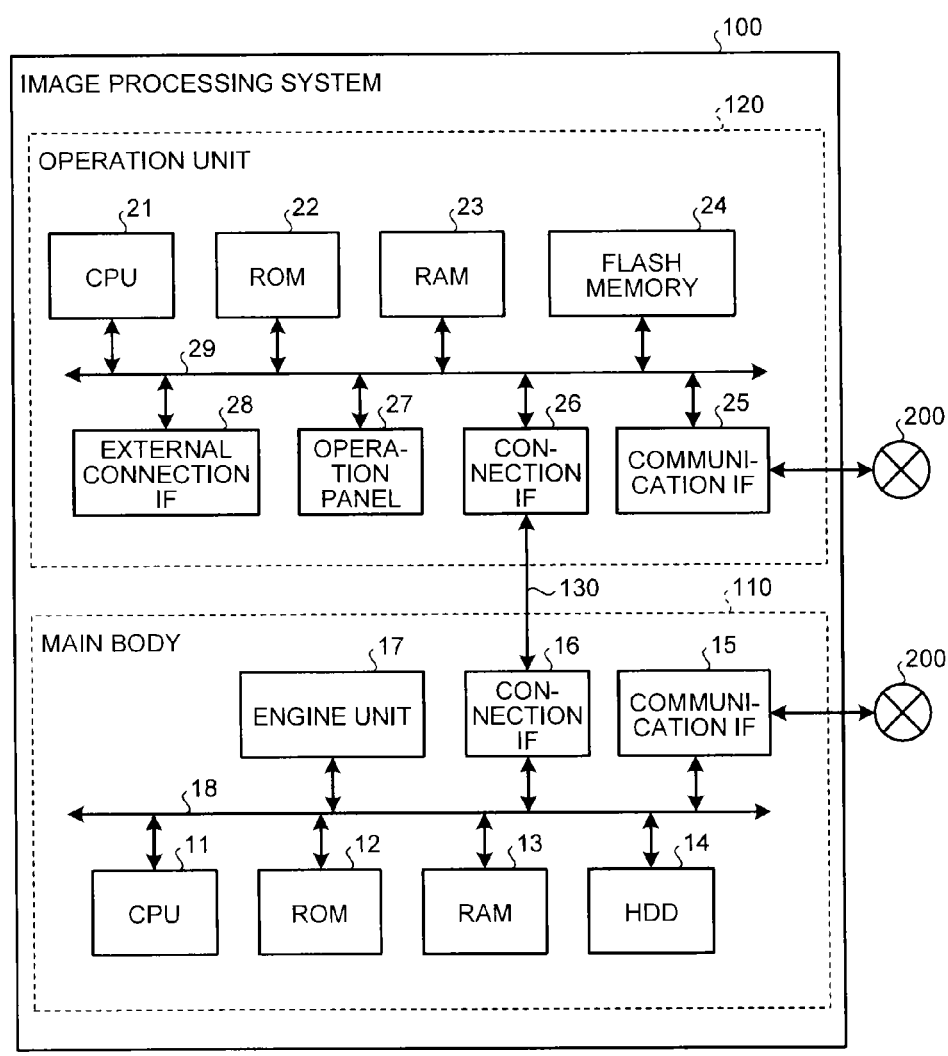
FIG. 16 is a diagram illustrating an example of the hardware configuration of an image processing system according to a third embodiment.

Next, the image processing system 100 according to a third embodiment will be described. FIG. 16 is a diagram illustrating an example of the hardware configuration of the image processing system 100 according to the third embodiment. The description of the third embodiment describes a case of implementing the image processing system 100 according to the first embodiment by a main body 110 described below and an operation unit 120 described below.

As illustrated in FIG. 16, the image processing system 100 includes the main body 110 and the operation unit 120. The main body 110 implements various functions such as the copy function, the scanner function, the fax function, and the printer function. The operation unit 120 accepts information in accordance with user's operation. The information in accordance with user's operation is a signal indicating a coordinate value of a screen, for example.

The main body 110 and the operation unit 120 are communicably connected with each other via a connection IF 16, a dedicated communication path 130, and a connection IF 26. For the communication path 130, the universal serial bus (USB) standard may be used, for example, and any standard may be used regardless of being wired or wireless.

The main body 110 performs operation in accordance with the operation received by the operation unit 120. The main body 110 can communicate with external devices such as a PC and can also perform operation in accordance with instructions (printing instructions or the like) received from the external devices.

The hardware configuration of the main body 110 will be described first. As illustrated in FIG. 16, the main body 110 includes a CPU 11, a ROM 12, a RAM 13, an HDD 14, a communication IF 15, a connection IF 16, and an engine unit 17. The CPU 11, the ROM 12, the RAM 13, the HDD 14, the communication IF 15, the connection IF 16, and the engine unit 17 are connected with each other via a system bus 18.

The CPU 11 comprehensively controls the operation of the main body 110. The CPU 11 executes a program stored in the ROM 12, the HDD 14, or the like with the RAM 13 as a work area, thereby controlling the operation of the entire main body 110 and implementing the above functions such as the copy function, the scanner function, the fax function, and the printer function.

The communication IF 15 is an interface for connecting to a network 200. The connection IF 16 is an interface for communicating with the operation unit 120 via the communication path 130.

The engine unit 17 is hardware that performs generic information processing and processing other than communication for implementing the copy function, the scanner function, the fax function, and the printer function. The engine unit 17 includes, for example, a scanner that scans and reads images of documents, a plotter that performs printing on sheet materials such as a sheet of paper, and a fax that performs fax communication. The engine unit 17 may further include hardware for implementing specific options such as a finisher that sorts printed sheet materials and an automatic document feeder (ADF) that automatically feeds documents.

Next, the hardware configuration of the operation unit 120 will be described. As illustrated in FIG. 16, the operation unit 120 includes a CPU 21, a ROM 22, a RAM 23, a flash memory 24, a communication IF 25, a connection IF 26, an operation panel 27, and an external connection IF 28. The CPU 21, the ROM 22, the RAM 23, the flash memory 24, the communication IF 25, the connection IF 26, the operation panel 27, and the external connection IF 28 are connected with each other via a system bus 29.

The CPU 21 comprehensively controls the operation of the operation unit 120. The CPU 21 executes a program stored in the ROM 22, the flash memory 24, or the like with the RAM 23 as a work area, thereby controlling the operation of the entire operation unit 120 and implementing the display of information (images) in accordance with input accepted from the user or the like.

The communication IF 25 is an interface for connecting to the network 200. The connection IF 26 is an interface of communicating with the main body 110 via the communication path 130.

The operation panel 27 accepts various inputs in accordance with user's operation and displays various information (information in accordance with the accepted operation, information indicating the operation state of the image processing system 100, and information indicating setting conditions or the like, for example). The operation panel 27 includes, but not limited to, a liquid crystal display (LCD) equipped with the touch panel function. The operation panel 27 may include, for example, an organic EL display device equipped with the touch panel function. The operation unit 120 may further include hardware keys (buttons) and display units such as a lamp as a user interface.

The external connection IF 28 is an interface such as the Near Field Communication (NFC) used for connecting to other devices such as a smart device.

Next, the software configuration of the image processing system 100 will be described.

Figure 17:
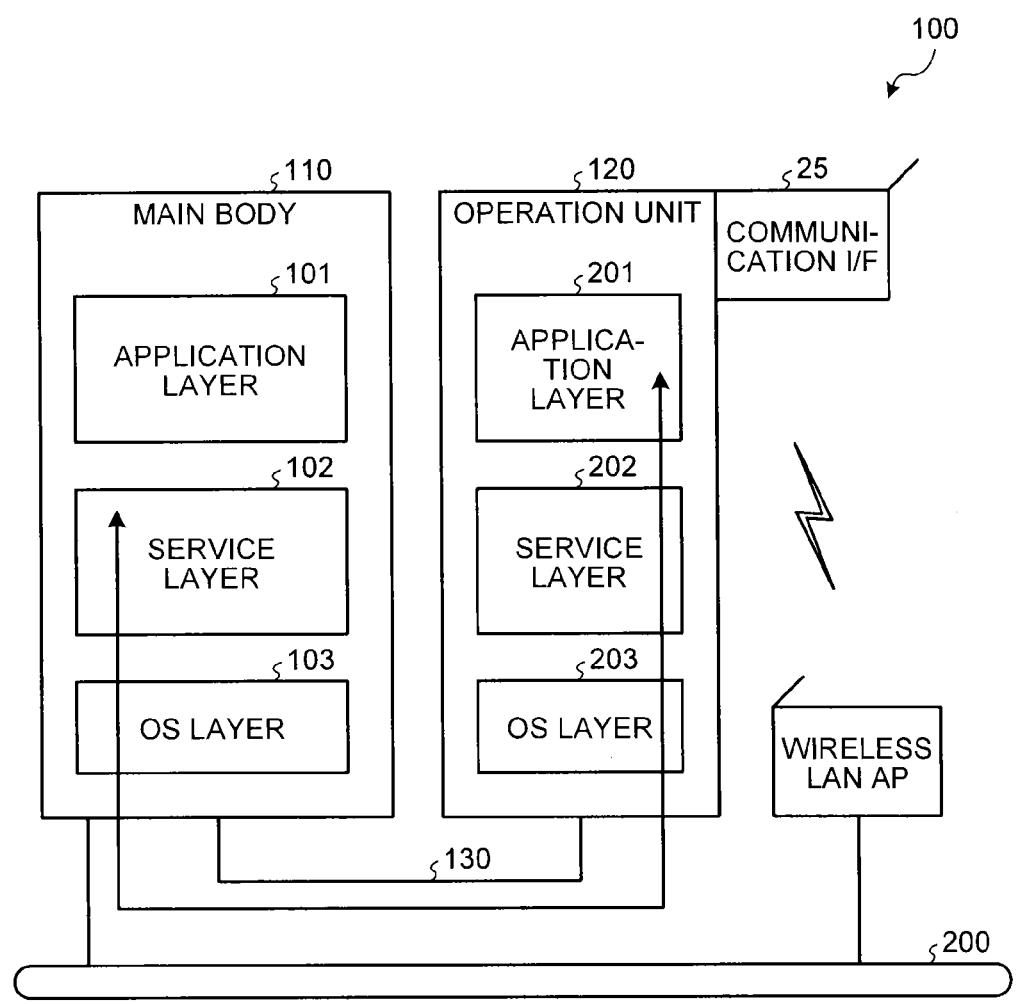
FIG. 17 is a diagram illustrating an example of the software configuration of the image processing system according to the third embodiment.

FIG. 17 is a diagram illustrating an example of the software configuration of the image processing system 100 according to the third embodiment. As illustrated n FIG. 17, the main body 110 includes an application layer 101, a service layer 102, and an OS layer 103. The entities of the application layer 101, the service layer 102, and the OS layer 103 are various pieces of software stored in the ROM 12, the HDD 14, or the like (refer to FIG. 16). The CPU 11 executes these pieces of software, thereby providing various functions.

The software of the application layer 101 is application software (which may be referred to as simply an "application" in the following description) for providing a predetermined function by operating hardware resources. Examples of the application may include a copy application for providing the copy function, a scanner application for providing the scanner function, a fax application for providing the fax function, and a printer application for providing the printer function.

The software of the service layer 102 is software for providing an interface that is interposed between the application layer 101 and the OS layer 103 and is for utilizing the hardware resources included in the main body 110, and more specifically, software for providing the function to perform acceptance of operation requests for the hardware resources and the arbitration of the operation requests. Examples of the operation requests accepted by the service layer 102 may include requests such as reading by the scanner and printing by the plotter.

The interface function by the service layer 102 is provided to not only the application layer 101 of the main body 110 but also an application layer 201 of the operation unit 120. In other words, the application layer 201 (application) of the operation unit 120 can also implement the function using the hardware resources (the engine unit 17 in FIG. 16, for example) of the main body 110 via the interface function of the service layer 102.

The software of the OS layer 103 is basic software (an operating system) for providing the basic function to control the hardware included in the main body 110. The software of the service layer 102 converts use requests for the hardware resources from various applications into commands interpretable by the OS layer 103 and delivers them to the OS layer 103. The commands are executed by the software of the OS layer 103, thereby causing the hardware resources to perform operations in accordance with the requests from the applications.

Similarly, the operation unit 120 includes the application layer 201, a service layer 202, and an OS layer 203. The application layer 201, the service layer 202, and the OS layer 203 included in the operation unit 120 are similar to the main body 110 in the hierarchical structure. However, the function provided by the application of the application layer 201 and the type of operation requests acceptable by the service layer 202 are different from those of the main body 110. The application of the application layer 201 may be software for operating the hardware resources included in the operation unit 120 and providing a predetermined function and is mainly software for providing a function of a user interface (UI) for performing operation and display concerning the functions (the copy function, the scanner function, the fax function, and the printer function) included in the main body 110.

In the third embodiment, the software of the OS layer 103 of the main body 110 and the software of the OS layer 203 of the operation unit 120 are different from each other in order to maintain functional independency. In other words, the main body 110 and the operation unit 120 operate mutually independently on separate operating systems. Linux (registered trademark) can be used for the software of the OS layer 103 of the main body 110, whereas Android (registered trademark) can be used for the software of the OS layer 203 of the operation unit 120, for example.

As described above, in the image processing system 100 according to the third embodiment, the main body 110 and the operation unit 120 operate on the separated operating systems, and the communication between the main body 110 and the operation unit 120 is performed not as inter-process communication in a common apparatus but as communication between different apparatuses. Examples of the communication between different apparatuses may include an operation (command communication) that transmits the information (the contents of instructions from the user) accepted by the operation unit 120 to the main body 110 and an operation in which the main body 110 notifies the operation unit 120 of an event. In this example, the operation unit 120 performs the command communication to the main body 110, thereby enabling the function of the main body 110 to be used. Examples of the event the main body 110 notifies the operation unit 120 may include the performance state of operation in the main body 110 and information set by the main body 110.

Although power supply to the operation unit 120 is performed from the main body 110 via the communication path 130 in the third embodiment, power control for the operation unit 120 may be performed separately from (independently of) power control for the main body 110.

Although the main body 110 and the operation unit 120 operate mutually independently on the separate operating systems in the third embodiment, it is not limited thereto and in another embodiment the main body 110 and the operation unit 120 may operate on the same operating system.

Figure 18:
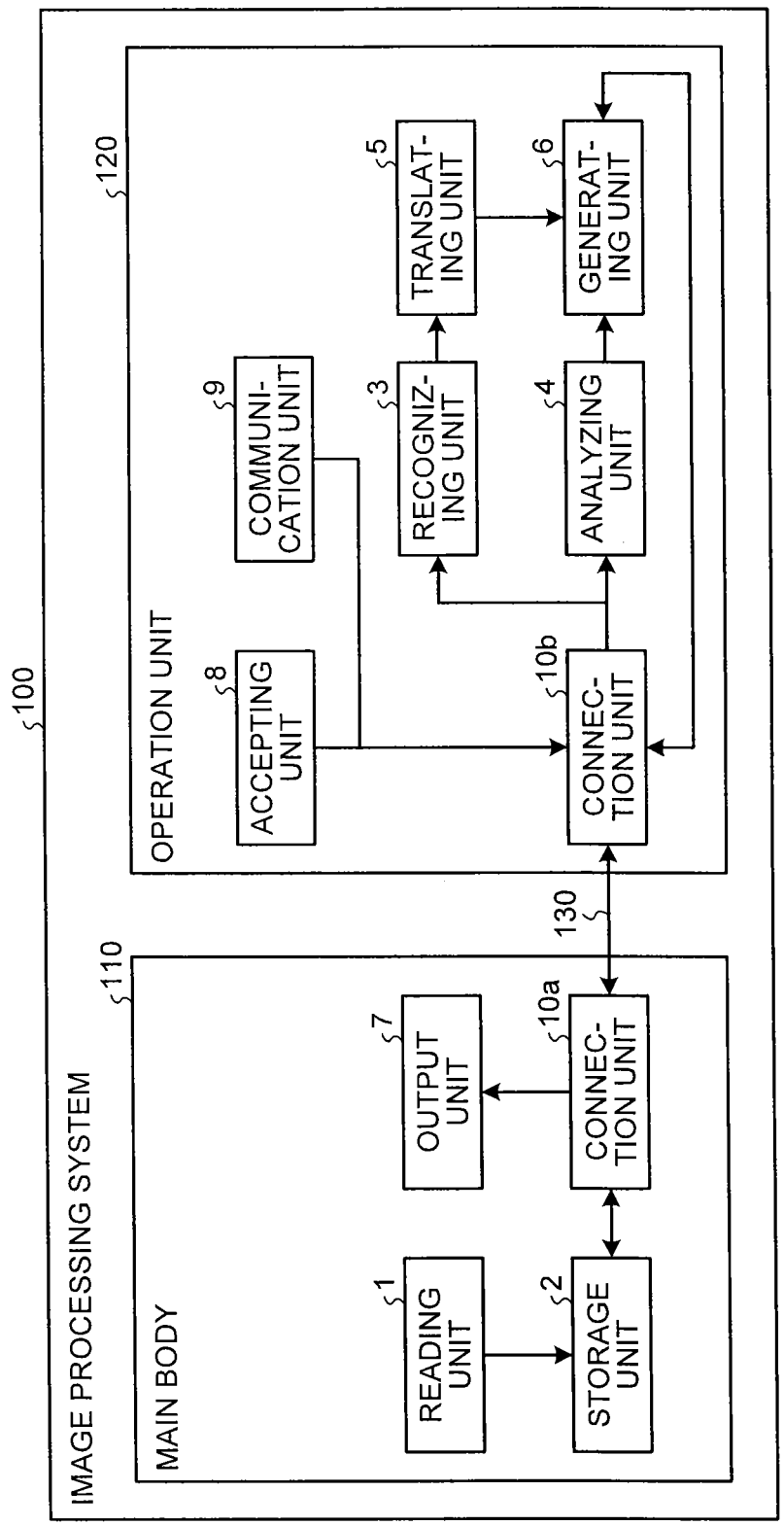
FIG. 18 is a diagram illustrating an example of the configuration of the image processing system according to the third embodiment.

Next, the configuration of the image processing system 100 according to the third embodiment will be described. FIG. 18 is a diagram illustrating an example of the configuration of the image processing system 100 according to the third embodiment.

The image processing system 100 includes the main body 110 and the operation unit 120. First, the main body 110 will be described. The main body 110 includes the reading unit 1, the storage unit 2, the output unit 7, and a connection unit 10a.

The reading unit 1 corresponds to the engine unit 17 (refer to FIG. 16). The reading unit 1 acquires read image data containing a read image (a document image) read from a document. The reading unit 1 stores the read image data in the storage unit 2. The storage unit 2 corresponds to the RAM 13 and the HDD 14 (refer to FIG. 16).

The output unit 7 corresponds to the engine unit 17 and the communication IF 15 (refer to FIG. 16). The output unit 7 outputs image data for output, translation image data, or translation target data as printout or electronic data. The output unit 7 includes an image forming engine unit (a developing unit, a transfer unit, a fixing unit, and/or the like), a double-sided printing unit that performs double-sided printing, and a finisher (a stapler and/or the like). When an output image is an electronic file, the output unit 7 transmits the electronic file or a link indicating the storage place of the electronic file to a user terminal.

The connection unit 10a corresponds to the connection IF 16 (refer to FIG. 16). The connection unit 10a transmits and receives data (the translation target data including the read image data and the electronic data, the translation image data, the image data for output, or the like) between the main body 110 and the operation unit 120 via the communication path 130.

Next, the operation unit 120 will be described. The operation unit 120 includes the recognizing unit 3, the analyzing unit 4, the translating unit 5, the generating unit 6, the accepting unit 8, the communication unit 9, and a connection unit 10b.

The recognizing unit 3 acquires the translation target data from the storage unit 2 via the connection unit 10a and the connection unit 10b and recognizes text contained in the translation target data. The recognizing unit 3 transmits text data indicating the recognized text to the translating unit 5.

The analyzing unit 4 acquires the translation target data from the storage unit 2 via the connection unit 10a and the connection unit 10b, analyzes the layout of images of the translation target data, and discriminates between a text area containing text and a non-text area containing no text. The analyzing unit 4 transmits layout data in which the text area is discriminated from the non-text area in an image area, to the generating unit 6. Any data prepared by document preparation software, presentation software, or spreadsheet software, for example, among the pieces of electronic data may be subjected to only translation processing on the text data (that performs processing to replace the original text with a translation by the generating unit 6 described below) without analyzing the layout by the analyzing unit 4.

The translating unit 5 receives the text data from the recognizing unit 3 and translates the text contained in the text data and acquires translation data. The translating unit 5 transmits the translation data to the generating unit 6.

The generating unit 6 acquires the translation target data from the storage unit 2 via the connection unit 10a and the connection unit 10b, receives the layout data from the analyzing unit 4, and receives the translation data from the translating unit 5. The generating unit 6 generates translation image data in which the text (the text data) in the text area of the translation target data is replaced with the text (the translation data) translated by the translating unit 5. The generating unit 6 generates image data for output containing the translation target data and the translation image data. The generating unit 6 stores therein the translation image data and the image data for output in association with the translation target data in the storage unit 2 via the connection unit 10a and the connection unit 10b.

The accepting unit 8 corresponds to the operation panel 27 (refer to FIG. 16). The accepting unit 8 accepts operation input from the user. The operation input means, for example, the selection of output data (the translation target data, the translation image data, or the image data for output), the selection of an output format (printout or electronic data), the selection of the layout of the image data for output, or the like.

The communication unit 9 corresponds to the communication IF 25 (refer to FIG. 16). The communication unit 9 receives the electronic data as the translation target and stores it in the storage unit 2 via the connection unit 10a and the connection unit 10b.

The connection unit 10b corresponds to the connection IF 26 (refer to FIG. 16). The connection unit 10b transmits and receives data (the translation target data including the read image data and the electronic data, the translation image data, the image data for output, or the like) between the main body 110 and the operation unit 120 via the communication path 130.

Among the above functional blocks of the image processing system 100, the recognizing unit 3, the analyzing unit 4, the translating unit 5, and the generating unit 6 are functional blocks that can also be implemented as a program. When the recognizing unit 3, the analyzing unit 4, the translating unit 5, and the generating unit 6 are implemented as the program, a modularized program including the recognizing unit 3, the analyzing unit 4, the translating unit 5, and the generating unit 6 is stored in a storage device (the ROM 22, the flash memory 24, for example). The CPU 21 executes the program, thereby implementing the recognizing unit 3, the analyzing unit 4, the translating unit 5, and the generating unit 6 on the RAM 23.

The program may be recorded and provided in a computer-readable recording medium such as a CD-ROM, a flexible disk (FD), a CD-R, a digital versatile disc (DVD), and a universal serial bus (USB) as an installable or executable file. The program may be provided or distributed via a network such as the Internet.

At least part of the recognizing unit 3, the analyzing unit 4, the translating unit 5, and the generating unit 6 may be implemented by a dedicated hardware circuit (a semiconductor integrated circuit, for example).

An image processing method of the image processing system 100 according to the third embodiment is similar to the image processing method of the image processing system 100 according to the first embodiment (refer to FIG. 11 and FIG. 12), and the description thereof is omitted.

As described above, the image processing system 100 according to the third embodiment performs the processing to generate the translation image data and the image data for output by the operation unit 120. The operation unit 120 according to the third embodiment is independent of the main body 110, which brings about advantages in terms of development costs and management such as setting data related to image processing and program updating.

An embodiment provides the effect that a translation result that makes it easy to associate the translation result with translation target data and is easy-to-see without spoiling the layout of a document can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system, comprising:
a translating unit that translates text contained in a text area of translation target data having a non-text area and acquire translation text data from the translation of the text;
a generating unit that generates translation image data including a non-text area and a text area, the text area being replaced with the translation text data, generates image data for outputs containing the translation target data, and forms a part of the translation text data on the non-text area immediately below the text area when the part of the translation text data does not fit within the text area;
an accepting unit that, from a user, selection of output data using the translation target data, the translation image data, or the image data for output, the accepting unit being an operation panel included in the image processing system; and
an output unit that outputs the output data selected by the accepting unit, wherein the output unit integrally prints the translation target data and the translation image data side by side as a single image on a single page when the accepting unit accepts selection of the output data.

2. The image processing system according to claim 1, wherein the generating unit reduces a size of text of the translation text data so that the translation text data can be contained within the text area when a data amount of the translation text data is larger than a data amount of the text of the translation target data.

3. The image processing system according to claim 1, wherein the generating unit replaces the text of the translation target data with part of the translation text data when a data amount of the translation text data is larger than a data amount of the text of the translation target data.

4. The image processing system according to claim 1, wherein the image data contains the translation target data and the translation image data in the same page.

5. The image processing system according to claim 1, wherein the image data contains a page of the translation target data and a page of the translation image data alternately.

6. An image processing method, comprising:
by a translating unit, translating text contained in a text area of translation target data having a non-text area;
acquiring translation text data from the translation of the text;
by a generating unit, generating translation image data including a non-text area and a text area, the text area being replaced with the translation text data;
generating image data for outputs containing the translation target data;
forming a part of the translation text data on the non-text area immediately below the text area when the part of the translation text data does not fit within the text area;
by an accepting unit, accepting, from a user, selection of output data using the translation target data, the translation image data, or the image data for output, the accepting unit being an operation panel included in an image processing system;
outputting the output data selected by the accepting unit; and
integrally printing the translation target data and the translation image data side by side as a single image on a single page when the accepting unit accepts selection of the output data.

7. The image processing system according to claim 1, wherein the translating unit and generating unit include software working with a processor configured to translate the text and generate the translation image data.

8. The image processing method according to claim 6, wherein the translating unit and generating unit include software working with a processor configured to translate the text, acquire the translation date, generate the translation image data, and output the translation target data.

9. The image processing system according to claim 1, wherein the single page corresponds to a sheet of A series size in landscape or portrait orientation.

10. The image processing system according to claim 1, wherein the generating unit replaces the translation text data with a translation of only a summary text of the translation target data when an amount of data in the translation text data is larger than an amount of data in the text of the translation target data.

11. An image processing system, comprising:
a translating unit that translates text contained in a text area of translation target data having a non-text area and acquire translation text data from the translation of the text;
a generating unit that generates translation image data including a non-text area and a text area, the text area being replaced with the translation text data, generates image data for outputs containing the translation target data, and forms a part of the translation text data on the non-text area immediately below the text area when the part of the translation text data does not fit within the text area;
an accepting unit that accepts, from user, selection of output data using the translation target data, the translation image data, or the image data for output, the accepting unit being an operation panel included in the image processing system; and
an output unit outputs the output data selected by the accepting unit, wherein the output unit double-sided prints alternately a first image before the translation and a second image after the translation based on the outputs of the generating unit when the accepting unit accepts selection of the output data.

12. The image processing system according to claim 1, wherein the accepting unit accepts operation input indicating selection of layout of the image data for output from the user.

13. The image processing system according to claim 1, wherein the accepting unit presents forms of a pattern, and choices of patterns being automatically displayed depending on a number of pages of the translation target data.

14. The image processing system according to claim 1, wherein the generating unit adds text strings indicating before translation or after translation.

15. The image processing system according to claim 11, wherein the accepting unit accepts operation input indicating selection of layout of the image data for output from the user.

16. The image processing system according to claim 11, wherein the accepting unit presents forms of a pattern, and choices of patterns being automatically displayed depending on a number of pages of the translation target data.

17. The image processing system according to claim 11, wherein the generating unit adds text strings indicating before translation or after translation.

* * * * *